United States Patent [19]

Davidson

[11] Patent Number: 4,818,550

[45] Date of Patent: Apr. 4, 1989

[54] APPARATUS AND PROCESS FOR MARINATING FOODSTUFFS

[75] Inventor: Peter G. Davidson, Malibu, Calif.

[73] Assignee: Robert H. Clark, III, Pacific Palisades, Calif.

[21] Appl. No.: 142,183

[22] Filed: Jan. 11, 1988

[51] Int. Cl.⁴ .................... A22C 9/00; A23L 1/318
[52] U.S. Cl. ................................ 426/281; 99/468; 99/472
[58] Field of Search .............. 99/472, 468; 426/281, 426/486

[56] References Cited

U.S. PATENT DOCUMENTS

| | | | |
|---|---|---|---|
| 657,207 | 9/1900 | Washburn | 99/451 |
| 1,183,721 | 5/1916 | Bowman | 99/285 |
| 1,216,260 | 2/1917 | Arnold | 99/472 |
| 2,116,813 | 5/1938 | Weisser et al. | 99/472 |
| 2,157,624 | 5/1939 | Overmyer | 99/472 |
| 2,629,311 | 2/1953 | Graves | 99/472 |
| 3,315,590 | 4/1967 | Payne | 99/472 |
| 3,370,959 | 2/1968 | Moore et al. | 426/281 |
| 3,928,634 | 12/1975 | Gasbarro | 426/281 |
| 4,018,908 | 4/1977 | Gross | 426/281 |
| 4,321,862 | 3/1982 | Stevenson | 99/472 |
| 4,331,691 | 5/1982 | Pooraiah et al. | 99/472 |
| 4,498,378 | 2/1985 | Norrie et al. | 99/472 |

FOREIGN PATENT DOCUMENTS 670610  1/1939  Fed. Rep. of Germany ........ 99/472

Primary Examiner—Wilbur Bascomb
Attorney, Agent, or Firm—Lyon & Lyon

[57] ABSTRACT

An apparatus and process for marinating foodstuffs in a short period of time. The apparatus includes a sealed vessel for holding the foodstuffs and the marinade, a valve mechanism and a pump for withdrawing air from the vessel through the valve mechanism. Upon withdrawing air from the vessel and reducing the pressure therein, the foodstuffs expand and air is drawn out of the foodstuffs, creating voids therein, and, upon opening the valve and returning the pressure therein to atmospheric, the marinade is drawn into the voids in the foodstuffs, thereby tenderizing and imparting flavor to the foodstuffs.

6 Claims, 3 Drawing Sheets

APPARATUS AND PROCESS FOR MARINATING FOODSTUFFS

BACKGROUND OF THE INVENTION

It is common practice to marinate less expensive cuts of meat prior to cooking, particularly when barbecuing, to tenderize and improve the flavor thereof. While marinating is generally successful in enhancing the flavor of the meat, its ability to tenderize is somewhat limited, and it is a very time consuming process. Allowing meat to rest in a marinade for as long as twenty-four hours prior to cooking is common. As time does not always permit such thorough marinating, the quality of the cooked steak is often less than what it would have been with proper preparation.

While marinating is generally not necessary with the higher quality and more expensive cuts of meat, lesser cuts, such as flank and shoulder steaks, will generally suffer in quality if not thoroughly marinated prior to cooking. Accordingly, people will often refrain from purchasing the less expensive cuts of meat because they either do not have the time to marinate the meat properly, and/or because they feel such meat is not sufficiently tender. While marinating is a simple process, the time it takes is often a substantial problem.

It would therefore be highly desirable to provide a means for thoroughly marinating foodstuffs which greatly reduces the time required to achieve the desired result. The apparatus and process disclosed herein not only thoroughly marinates foodstuffs in a small fraction of the time heretofore required for the process, but tenderizes the food stuffs to a greater extent than conventional marinating.

SUMMARY OF THE INVENTION

Briefly, the present invention is directed to an apparatus and process for rapidly marinating foodstuffs to enhance the flavor and tenderness thereof. The apparatus includes a pressure-tight vessel and a pump assembly for withdrawing air from the vessel and maintaining the interior of the vessel at a reduced pressure. The foodstuff to be marinated is placed in a marinade within the vessel. The pressure within the vessel is then reduced by withdrawing air from the vessel, causing the foodstuff to swell, while the air trapped within the food is drawn therefrom. The foodstuff is then allowed to remain in the marinade for a short period of time, whereupon the interior of the vessel is returned to atmospheric pressure. As the pressure rises within the vessel, the marinade passes into the foodstuffs, filling the voids created by the exiting air, thereby rapidly tenderizing and imparting the flavor of the marinade to the foodstuff.

It is the principal object of the present invention to provide a method and apparatus for thoroughly marinating foodstuff in a short period of time.

It is another object of the present invention to provide a method and apparatus for rapidly imparting the flavor of a marinade to an inexpensive cut of meat, while concurrently tenderizing the meat.

These and other objects and advantages of the present invention will become apparent from the following detailed description taken in connection with the accompanying drawings.

DESCRIPTION OF THE PREFERRED EMBODIMENT

Figure 1:
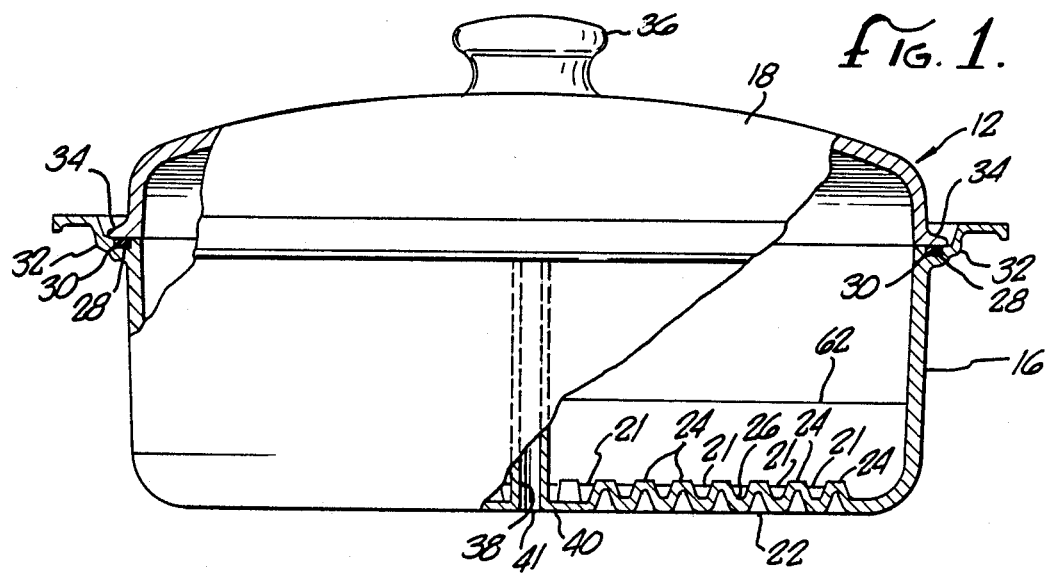
FIG. 1 is a side view of the vessel of the present invention.
Figure 2:
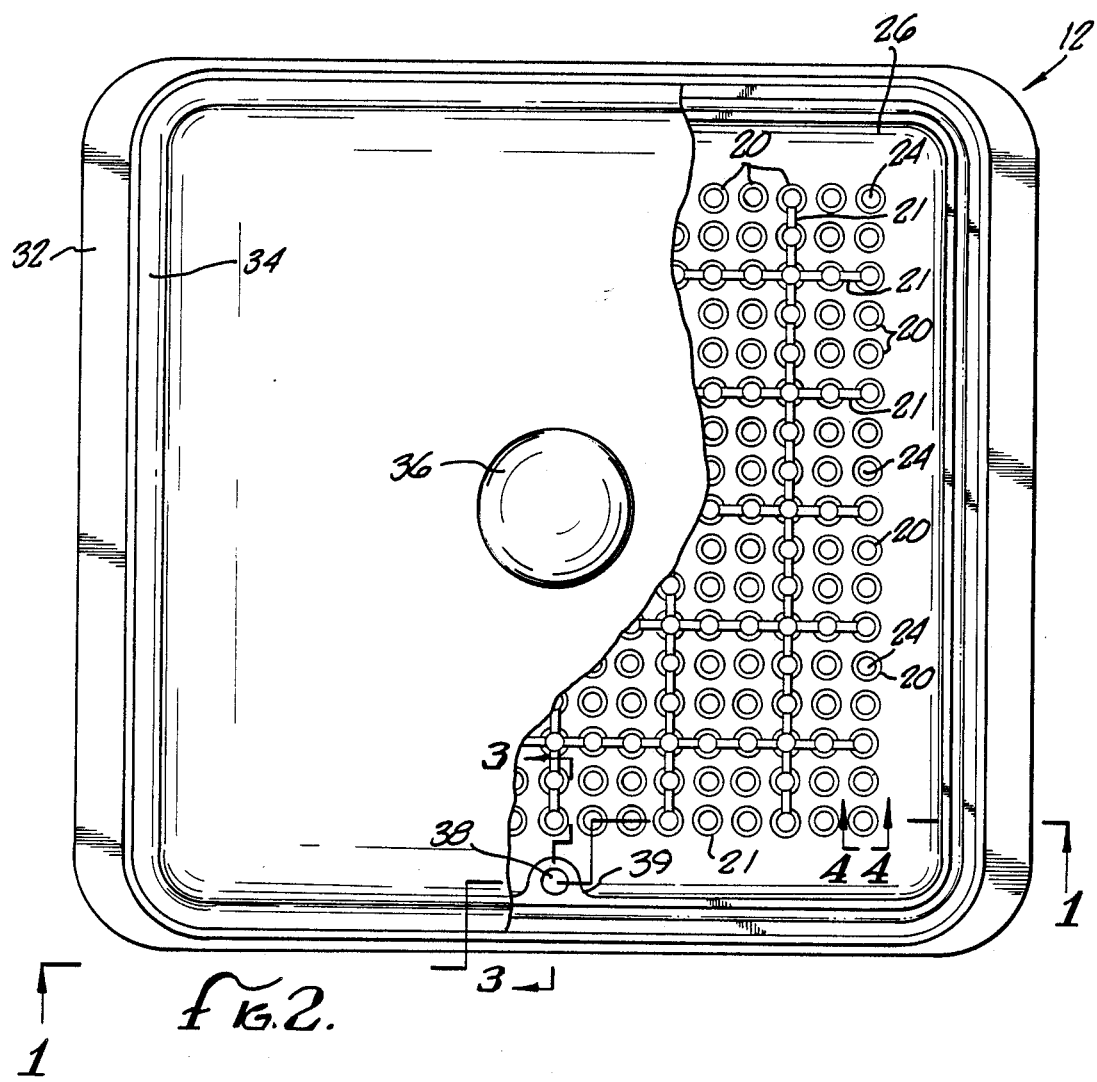
FIG. 2 is a top view of the vessel of the present invention with a portion of the lid broken away to illustrate the bottom surface of the vessel.
Figure 3:
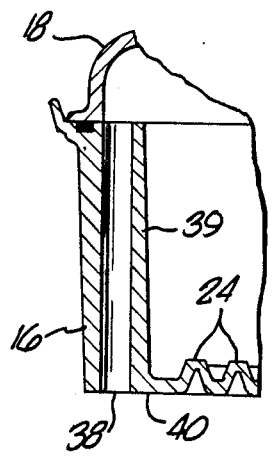
FIG. 3 is a sectional view taken along line 3—3 in FIG. 2.
Figure 4:
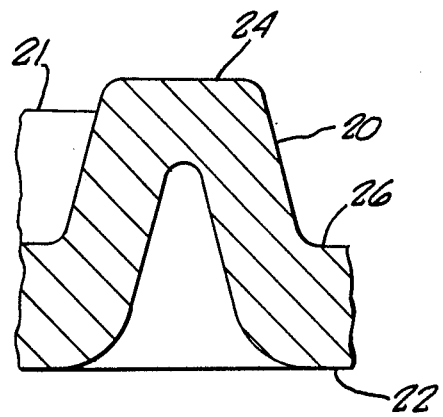
FIG. 4 is a sectional view taken along line 4—4 of FIG. 2.
Figure 5:
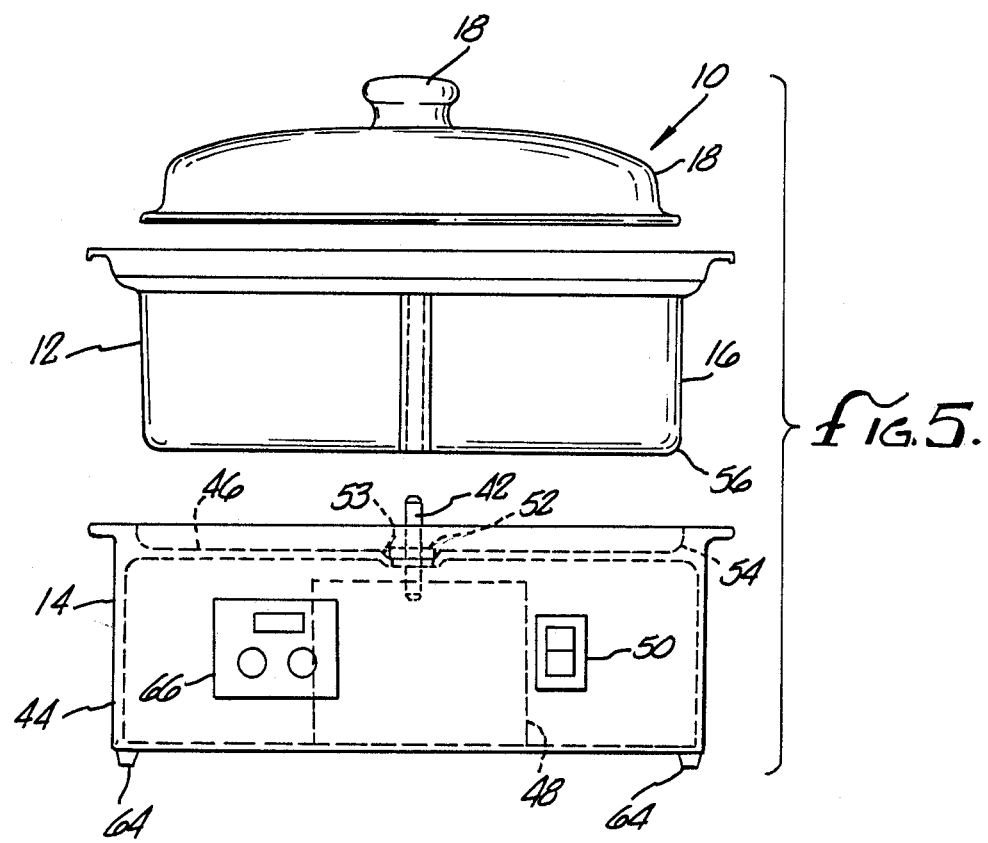
FIG. 5 is a side partial sectional view of the vessel and base assembly of the present invention.

Referring now in detail to the drawings, the preferred embodiment of the marinating assembly 10 illustrated in FIGS. 1 and 5 comprises a pressure-tight vessel 12 and base assembly 14. The vessel 12 is comprised of a walled body portion or pan 16 and a removable lid 18. The bottom wall 22 of vessel 12 is formed so as to define a plurality of upstanding, spaced apart frustoconical projections 20 and a plurality of strengthening ribs 21 which extend between and interconnect adjacent ribs in a rectangular pattern as seen in FIG. 2. Each projection terminates at its upper end in a support surface 24. The plurality of individual support surfaces 24 are co-planar so as to define a support surface for the foodstuffs to be marinated (not shown), which is elevated above the bottom interior surface 26 of vessel 12.

This configuration allows marinade to flow between the projections 20 on the bottom interior surface 26 of the vessel and thus below support surface 24 to access the underside of the foodstuffs. Other configurations such as elevated ribs could be employed to elevate the foodstuff to be marinated above the bottom interior surface on which the foodstuff rests. An annular seal 28 such as a silicone "O" ring is held within a recess 30 in an annular flange 32 extending about the upper end of the body portion 16 of the vessel. Seal 28 abuts the flat underside of an annular flange 34 extending about lid 18 to render the vessel airtight. Lid 18 is also provided with a handle 36 for removing the lid from the body portion of the vessel.

The body portion 16 of the vessel also includes an open ended vacuum chamber 38 adjacent one of the side walls thereof. Chamber 38 is defined by an interior curvilinear wall 39 formed with one of the side walls of the vessel 12 as seen in FIG. 2. Chamber 38 terminates at its lower end in bottom wall 222 and at its upper end below lid 18. An annular flat surface 40 is disposed about the oven end 41 of chamber 38 for sealing engagement with the base assembly 14 as will be described.

Base assembly 14 is comprised of a housing 44 which defines an upper horizontal vessel support surface 46, an electrically operated vacuum pump 48 disposed within housing 44, and switch means 50 for activating vacuum pump 48. A vacuum port 42 is carried by support surface 46 and extends vertically upwardly therefrom and is sized for airtight securement within the vacuum chamber 38 in vessel 12. A sealing washer 52 is disposed about vacuum port 42 in a recessed portion 53 of the horizontal support surface 46 of the base assembly 14 such that the upper surface of the sealing washer 52 is co-planar with the support surface 46. Support surface 46 is preferably recessed into the base assembly 14 with a portion 54 of the base assembly extending about the support surface 46 being contoured to conform to the curvilinear configuration of the outer perimeter 56 of the lower portion of vessel 12. Upon disposing the vessel 12 upon the base assembly 14, the bottom wall 22 of vessel 12 rests on support surface 46 of assembly 14 with sealing washer 52 abutting the annular flat surface 40 disposed about the lower open end of chamber 38 and the vacuum port 42 carried by the base assembly 14 extending into vacuum chamber 38 and forming an airtight seal therewith.

Switch means 50 is operably connected to the vacuum pump 48, which in turn communicates with the vacuum port 42 such that upon activating switch means 50, air is drawn from vessel 12, through vacuum chamber 38, into assembly 14 through vacuum port 42, conduit 58 and outwardly of pump 48. Due to the airtight seal between the lid 18 and body portion 16 of vessel 12 and the airtight securement of the vacuum port 42 on base assembly 14 within vacuum chamber 38 of vessel 12, activation of pump 48 creates a vacuum within the sealed vessel 12. Vacuum pump 48 is of conventional configuration capable of drawing a vacuum within vessel 12 within the range of 15-24 in. Hg. Pump 48 is preferably not provided with a check valve to maintain the pressure within the vessel 12 upon deactivation of the pump. Accordingly, upon deactivating pump 48 by means of switch 50, air can flow back into vessel 12 through vacuum port 42, thereby returning the interior of vessel 12 to atmospheric pressure. If the pump 48 were provided with such a check valve, a pressure release valve mechanism would be required to release the air from the vessel after the pump was deactivated. Without such a valve, the lid 18 could not be removed from the vessel due to the reduced pressure therein.

In the preferred embodiment of the invention, the body portion 16 of vessel 12 has a maximum fill line 62 for the marinade molded onto the interior side wall of the vessel to reduce the chance of overfill. The vessel 12 is preferably constructed of PET polyester manufactured by Eastman Chemical Products, as it can be used in both microwave and conventional ovens, has good barrier properties, and high head resistance. The base assembly 14 is additionally provided with rubber foot mountings 64 to dampen any vibration and, if desired, a timer 66 can be provided to automatically shut off the vacuum pump 42 after a predetermined time of operation. It has been found that five minutes provides ample time to complete the marinating process using the above described apparatus assembly 10.

In use, the foodstuffs to be marinated are placed within vessel 12, marinade is then poured into the vessel to a desired depth, up to the maximum fill line 62, lid 18 is placed atop the body portion 16 of the vessel, and the vessel is disposed atop the base assembly, with the vacuum port 42 in sealing engagement with the side walls of the vacuum chamber 38 in vessel 12. The vacuum pump is then activated, drawing air out of the sealed vessel 12 and reducing the air pressure therein to create a pressure differential within the range of 15-24 in. Hg. As the pressure within the vessel drops, the air within the meat or other foodstuff is drawn out of the foodstuff and bubbles to the surface of the marinade. As the vacuum increases, more air evacuates the foodstuffs. After about five minutes, the marinating process is complete. The vacuum pump 48 is deactivated and the vacuum within the vessel is released. As the air pressure increases in the vessel 12, the marinade invades the foodstuffs into the voids therein created by the exiting air.

In a test utilizing the aforesaid process with a boneless beef chuck shoulder steak, it was found that a vacuum of about 24 in. Hg. was obtained after about one minute of activation of the vacuum pump 48. This vacuum was maintained for four minutes, whereupon the pump was deactivated and the interior of the vessel was returned to atmospheric pressure. The steak was then reweighed. The result was a weight increase of the meat of about 2.3%, which represented a more thorough marinating of the meat in five minutes than was obtained in twenty-four hours of marinating by the conventional process.

Figure 6:
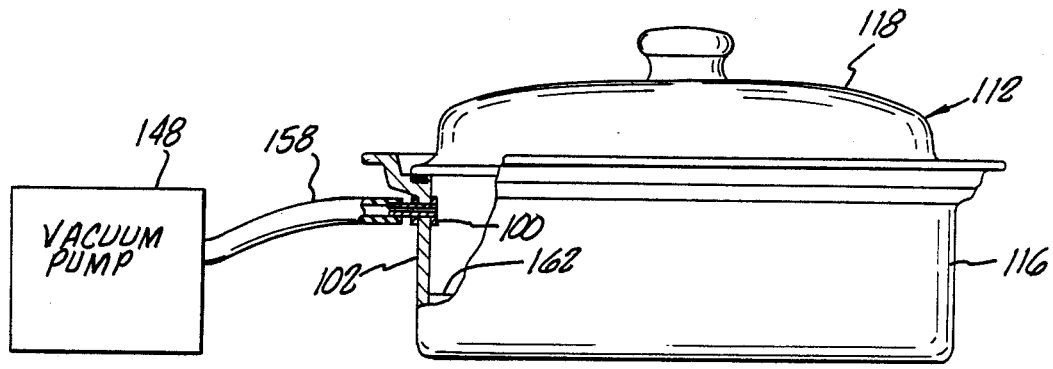
FIG. 6 is a side view of an alternate embodiment of the present invention.

An alternate embodiment of the present invention is illustrated in FIG. 6. This alternate embodiment differs from the prior embodiment in that it does not employ a base assembly. The vacuum chamber 38 of the prior embodiment is replaced with a port 100 disposed in the side wall 102 of the body portion 116 of the vessel 112. Port 100 is disposed above the marinade fill line 162 so as to avoid drawing marinade therethrough. An external electric vacuum pump 148, similar to pump 48 in the prior embodiment is disposed externally of the vessel 112 and communicates with the interior therein through port 100 via a conduit 158. As with the prior embodiment, activation of vacuum pump 148 reduces the pressure within vessel 12 and maintains the reduced pressure. Deactivation of pump 148 relieves the pressure imbalance for removal of lid 118. Other than as described, the construction and operation of this alternate embodiment is the same as the prior embodiment.

Figure 7:
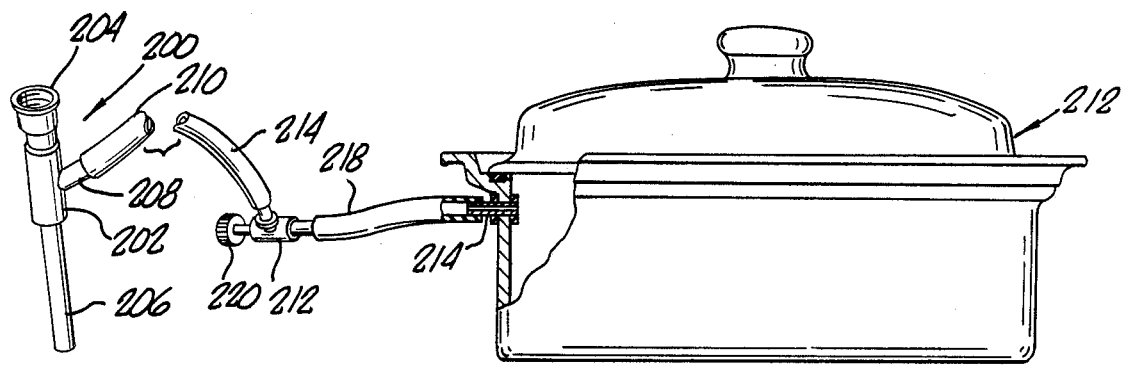
FIG. 7 is a perspective view of a second alternate embodiment of the present invention.

A second alternative embodiment of the present invention is illustrated in FIG. 7. In this embodiment, the electric vacuum pumps 48 and 148 of the prior embodiment are replaced with a hydraulic vacuum assembly 200 of the type adapted to be secured to a kitchen or outdoor faucet. As seen in FIG. 5, assembly 200 comprises a tubular body portion 202, an upper fluid inlet fitting 204 adapted to be threadably or otherwise secured to a faucet, a flow through outlet tube 206 axially aligned with the body portion 202 and inlet fitting 204, and a lateral air inlet tube 208 disposed in the body portion 202 and communicating with the interior thereof. A conduit 210 is secured to and extends between the lateral air inlet tube 208, and a valve assembly 212 which in turn communicates with a vacuum port 214, disposed in the wall of vessel 212 via conduit 218. Valve assembly 212 comprises a check valve and a release mechanism 220 for opening the valve assembly so that air can pass therethrough into the vessel to relieve a vacuum therein.

Upon opening the faucet to which the assembly 200 is secured, water under pressure passes through the body portion 202 of the assembly and outlet tube 206, which in turn siphons air out of the interior of vessel 212 through conduits 210 and 218 and reduces the pressure within the vessel. Otherwise the operation of the second alternative embodiment is the same a that described with respect to prior embodiments. It should be noted that other means such as a hand pump could also be employed for evacuating air from the vessel to reduce the pressure therein to a level within the range about 15-24 in. Hg. below atmospheric pressure.

Various other changes and modifications can be made in carrying out the present invention without departing from the spirit and scope thereof. Insofar as these changes and modifications are within the purview of the appended claims, they are to be considered as part of the present invention.

I claim:

1. An apparatus for marinating foodstuffs in a marinade comprising: a vessel adapted to contain a marinade and foodstuffs; and a base assembly, said vessel including a body portion having side and bottom walls, a removable lid, a sealing member for providing an airtight seal between said body portion and said lid, an open ended vacuum chamber disposed within said body portion, said chamber terminating at its lower end adjacent the bottom wall of said body portion, a plurality of substantially co-planar foodstuffs support surfaces disposed within said body portion of said vessel above said bottom wall thereof such that marinade in said vessel can flow below said surfaces; said base assembly including an upper horizontal surface adapted to support said vessel thereon, a vacuum port carried by and extending upwardly from said horizontal surface, said port being adapted to extend into said vacuum chamber in sealing engagement therewith upon said vessel being disposed on said upper surface of said base assembly, a vacuum pump assembly disposed within said base assembly in fluid communication with said port for withdrawing air from said vessel through said port to reduce the pressure within said vessel to a level about 15-24 in. Hg. below atmospheric pressure, and means for activating and deactivating said vacuum pump assembly.

2. The combination of claim 1 wherein said support surfaces are defined by a plurality of raised projections extending upwardly from the bottom wall of said vessel.

3. The combination of claim 2 wherein said means for activating and deactivating said pump assembly includes clock means for deactivating said pump assembly after a predetermined period of time and said pump assembly includes means for allowing air to enter said vessel with said lid in sealing engagement with said body portion to return the pressure within said vessel to atmospheric.

4. An apparatus for marinating foodstuffs in a marinade comprising: a vessel adapted to contain a marinade and foodstuffs; and a base assembly, a horizontal support surface defined by said base assembly, said vessel being adapted to be disposed on said support surface and define therewith a vacuum chamber, a foodstuff support surface disposed within said vessel, an annular sealing member carried by said base member and adapted to abut said vessel for forming an airtight seal threrebetween, a vacuum port carried by and extending upwardly from said horizontal support surface into said vacuum chamber, a vacuum pump assembly disposed within said base assembly in fluid communication with said port for withdrawing air from said vacuum chamber through said port to reduce the pressure within said vessel to about 15-24 in. Hg. below atmospheric pressure, and means for activating and deactivating said pump assembly.

5. The combination of claim 4, wherein said foodstuff support surface is comprised of a plurality of raised projections extending upwardly into said vessel, said projections defining a plurality of co-planar surfaces for supporting the foodstuffs such that the marinade within said vessel can flow between said co-planar surfaces.

6. A process for marinating foodstuffs in a short period of time consisting only of the steps of: placing the foodstuffs in a marinade in an airtight vessel; reducing the pressure within the vessel to a level of about 15-24 in. Hg. below atmospheric pressure; allowing the foodstuffs to remain at rest in the marinade for about 3-5 minutes; introducing air into the vessel to raise the pressure therein to atmospheric; and removing the foodstuffs from the marinade.

* * * * *